United States Patent
Fechner et al.

(10) Patent No.: US 8,828,897 B2
(45) Date of Patent: Sep. 9, 2014

(54) ALUMINO-SILICATE GLASS HAVING HIGH THERMAL STABILITY AND LOW PROCESSING TEMPERATURE

(75) Inventors: Jörg H. Fechner, Weiden (DE); Franz Ott, Konnersreuth (DE); Erhard Dick, Pechbrunn (DE); Christof Kass, Tirschenreuth (DE)

(73) Assignee: Schott AG, Mainz (DE)

( * ) Notice: Subject to any disclaimer, the term of this patent is extended or adjusted under 35 U.S.C. 154(b) by 260 days.

(21) Appl. No.: 13/408,808

(22) Filed: Feb. 29, 2012

(65) Prior Publication Data

US 2013/0059716 A1 Mar. 7, 2013

Related U.S. Application Data

(63) Continuation of application No. PCT/EP2010/005781, filed on Sep. 22, 2010.

(30) Foreign Application Priority Data

Sep. 25, 2009 (DE) .................. 10 2009 042 796

(51) Int. Cl.
*C03C 3/087* (2006.01)
*C03C 4/00* (2006.01)

(52) U.S. Cl.
CPC ............... *C03C 3/087* (2013.01); *C03C 4/0092* (2013.01)
USPC ............................................................ 501/70

(58) Field of Classification Search
CPC ....................................................... C03C 3/087
USPC ....................................................... 501/70
See application file for complete search history.

(56) References Cited

U.S. PATENT DOCUMENTS

| | | |
|---|---|---|
| 3,600,205 A | 8/1971 | Breton |
| 5,766,680 A | 6/1998 | Schmidt et al. |
| 5,858,897 A | 1/1999 | Maeda et al. |
| 6,858,552 B2 | 2/2005 | Peuchert |
| 7,905,115 B2 | 3/2011 | Raeke et al. |
| 8,004,196 B2 | 8/2011 | Fechner et al. |
| 2005/0003136 A1 | 1/2005 | Kurachi et al. |
| 2006/0010917 A1 | 1/2006 | Fechner et al. |
| 2008/0060382 A1 | 3/2008 | Rake et al. |
| 2009/0129061 A1 | 5/2009 | Fechner et al. |

FOREIGN PATENT DOCUMENTS

| | | |
|---|---|---|
| DE | 43 33 407 C1 | 11/1994 |
| DE | 103 06 427 A1 | 10/2003 |
| DE | 20 2005 004 459 U1 | 12/2005 |
| DE | 10 2005 000 664 A1 | 11/2006 |
| DE | 10 2006 005 611 A1 | 11/2006 |
| DE | 10 2008 056 323 A1 | 5/2009 |
| EP | 0 769 481 A1 | 4/1997 |
| EP | 0 879 800 A1 | 11/1998 |
| JP | 64-17335 A | 1/1989 |
| JP | 1-239037 A | 9/1989 |
| JP | 3040933 A | 2/1991 |
| JP | 07-101748 A | 4/1995 |
| JP | 07-173423 A | 7/1995 |
| JP | 10-500072 A | 1/1998 |
| JP | 2004043295 A | 2/2004 |
| JP | 2005015328 A | 1/2005 |
| WO | 94/07269 A1 | 3/1994 |
| WO | 98/49111 A1 | 11/1998 |

OTHER PUBLICATIONS

English translation of International Search Report dated Jan. 27, 2011 for PCT/EP2010/005781 (3 pages).
International Preliminary Report on Patentability dated Nov. 25, 2011 (with Annex dated Jul. 15, 2011 from Dr. Michael Sawodny) for PCT/EP2010/005781 (21 pages).
Witten Opinion of the International Searching Authority (undated) for PCT/EP2010/005781 (8 pages).
International Preliminary Report on Patentability dated Nov. 4, 2011 (with Annex dated Jul. 15, 2011 from Dr. Michael Sawodny) for PCT/EP2010/005781 (18 pages).
G. Cho et al., J. Phys. D: Appl. Phys. vol. 37, (2004), pp. 2863-2867; "Pinhole formation in capacitively coupled external electrode fluorescent lamps".
T.S. Cho et al., Jpn. J. Appl. Phys. vol. 41, (2002), pp. 7518-7521; "Characteristic Properties of Fluorescent Lamps Operated Using Capacitively Coupled Electrodes".

*Primary Examiner* — Karl Group
*Assistant Examiner* — Elizabeth A Bolden
(74) *Attorney, Agent, or Firm* — Taylor IP, P.C.

(57) ABSTRACT

The invention relates to an alumino-silicate glass which has a thermal expansion coefficient in the range of 8 to $10 \times 10^{-6}$/K in a temperature range of 20 to 300° C., a transformation temperature Tg in a range of 580° C. to 640° C., and a processing temperature VA in a range of 1065° C. to 1140° C. and which can therefore be used as an alternative for soda lime glasses. An object of the invention is also the use of the inventive glasses in applications where a high temperature stability of the glasses is advantageous, in particular as substrate glass, superstrate glass and/or cover glass in the field of semiconductor technology, preferably for Cd—Te or for CIS or CIGS photovoltaic applications and for other applications in solar technology.

35 Claims, No Drawings

ALUMINO-SILICATE GLASS HAVING HIGH THERMAL STABILITY AND LOW PROCESSING TEMPERATURE

CROSS REFERENCE TO RELATED APPLICATIONS

This is a continuation of PCT application No. PCT/EP2010/005781, entitled "ALUMINOSILICATE GLASS HAVING HIGH THERMAL STABILITY AND LOW PROCESSING TEMPERATURE", filed Sep. 22, 2010, which is incorporated herein by reference.

BACKGROUND OF THE INVENTION

1. Field of the Invention

The invention relates alumino-silicate glasses having high thermal stability and low processing temperature.

2. Description of the Related Art

Soda-lime glass which is also known as alkaline-earth alkaline-silicate glass belongs to the oldest known glass type and represents the most widely used ("normal glass"). Soda-lime glass finds its application mostly in the form of flat glass, for example as minor or window glass, and as packaging glass, for example for bottles, food packaging, drinking glasses, etc. A disadvantage of soda-lime glass is that it has only a relatively low thermal stability, for example with a transformation temperature (Tg) in the range of approximately 490° to 530° C. This clearly limits application of the hitherto known soda lime glass.

There is a constant requirement to vary and to modify glass compositions in order to change and improve the characteristics and to better adapt them to desired applications. However, in this context it is always a problem that reducing or increasing one share of a component can already trigger a multitude of effects which will influence the glass characteristics differently. The reactions and consequences when exchanging or modifying several components in a glass composition are even more complex and often difficult or even impossible to predict. It is therefore relatively difficult to provide tailor-made glass compositions for particular applications.

There are many publications available in the current state of the art which address generic glass.

JP 07-101748 A describes alkaline glasses with low aluminum content for plasma-display panels, whereby the glass composition consists of 0.3-2.5 weight % $Li_2O$, 7.0-12 weight % $Na_2O$, 1.5-4.5 weight % $K_2O$, 0-5.0 weight % MgO, 6.0-9.0 weight % CaO, 0-5 weight % SrO, 3.5-15.0 weight % BaO, 2.0-4.5 weight % $Al_2O_3$, 57.0-68.0 weight % $SiO_2$, 0-5.0 weight % $ZrO_2$ and 0-0.5 weight % $CeO_2$, whereby the sum $Li_2O+Na_2O+K_2O$ is 9.0-16.0 weight %.

U.S. Pat. No. 5,858,897 describes a glass composition for a substrate which is especially suitable for a flat display, preferably a plasma display (PDP, plasma display panel). The glass composition consists essentially of: 59-72 weight % $SiO_2$, 1-15 weight % $Al_2O_3$, 0.5-9 weight % MgO, 0.5-11 weight % CaO, 0-6 weight % SrO, 0-5 weight % BaO, 4-19 weight % MgO+CaO+SrO+BaO, 0-9 weight % $Na_2O$, 4-21 weight % $K_2O$, 10-22 weight % $Na_2O+K_2O$, 0.5-10.5 weight % $ZrO_2$, whereby the difference between SiO2-content and Al2O3-content is 50 to 71 weight % and the relative density less than 2.6.

Moreover, EP 0 769 481 A1 discloses a glass composition for a substrate, in particular for plasma displays, whereby the glass composition comprises: 52-62 weight % $SiO_2$, 5-12 weight % $Al_2O_3$, 0-4 weight % MgO, 3-5.5 weight % CaO, 6-9 weight % SrO, 0-13 weight % BaO, 17-27 weight % MgO+CaO+SrO+BaO, 7-14 weight % $Li_2O+Na_2O+K_2O$, 0.2-6 weight % $ZrO_2$ and 0-0.6 weight % $SO_3$. Such a high SrO-content in the glass composition has however greater disadvantages. SrO is a relatively expensive material so that the production of the glass becomes clearly more expensive. The advantages claimed in EP 0 769 481 A1 that the transformation temperature clearly increases and the thermal heat expansion coefficient rises could not be substantiated according to the invention. On the contrary, an increased SrO content provided no positive influence upon the characteristics and effects for the inventive fields of application; according to the invention SrO is therefore not present in the here described high amounts.

Moreover, EP 0 879 800 A1 describes solarization stable alumino-silicate glass which is suitable for application in display technology, in particular for plasma display panels and which have the following composition:

| | |
|---|---|
| $SiO_2$ | 45-68 weight % |
| $Al_2O_3$ | >5-18 weight % |
| $Na_2O$ | 0-5 weight % |
| $K_2O$ | >9-15 weight % with |
| $Na_2O + K_2O$ | ≥10 weight % |
| CaO | 0-10 weight % |
| SrO | 0.5-18 weight % |
| BaO | 0-10 weight % with |
| CaO + SrO + BaO | 8-<17 weight % |
| $ZrO_2$ | 1-6 weight % |
| $TiO_2$ | 0.2-5 weight %. |

Finally, US 2005/0003136 A1 discloses a glass composition which possesses excellent thermal stability as well as very good ion-exchange capacity. An increased mechanical strength of the glass is achieved by an additional chemical treatment through ion-exchange. The glass composition comprises: 59 to 68 weight % $SiO_2$, 9.5 to 15 weight % $Al_2O_3$, 0 to 1 weight % $Li_2O$, 3 to 18 weight % $Na_2O$, 0 to 3.5 weight % $K_2O$, 0 to 15 weight % MgO, 1 to 15 weight % CaO, 0 to 4.5 weight % SrO, 0 to 1 weight % BaO, 0 to 2 weight % $TiO_2$ and 1 to 10 weight % $ZrO_2$. This glass composition is to be used preferably as glass substrate for magnetic recording media. A disadvantage of this glass composition is however the insufficient crystallization stability. This means that during cooling of the glass during the manufacturing process, for example during tube-drawing, devitrification crystals form which inhibit shaping of the glass on the glass surface. Besides, the actual glass character is lost through a crystallization.

A requirement exists therefore to improve known glasses in regard to their characteristics.

It is therefore the aim of the current invention, and what is needed in the art is, to avoid the disadvantages of the current state of the art and to provide an alternative to soda lime glasses which have a similar thermal expansion of approximately 8 to $10 \times 10^{-6}$/K and a higher thermal resistance (Tg) and at the same time have similar or only slightly higher processing temperatures (VA) compared to soda lime glasses. Furthermore, the boron content should be as low as possible because of toxicological as well as economic considerations.

SUMMARY OF THE INVENTION

According to the invention the objective of the current invention is solved by, and the present invention provides, an alumino-silicate glass, comprising or consisting of the following glass composition (in weight % on oxide basis):

| | |
|---|---|
| $SiO_2$ | 49-69 weight % |
| preferably $SiO_2$ | 49-<59 weight % |
| $B_2O_3$ | 0-2 weight % |
| preferably $B_2O_3$ | 0 weight % |
| $Al_2O_3$ | >4.7-15 weight % |
| preferably $Al_2O_3$ | >5-15 weight % |
| $Li_2O$ | 0-4 weight % |
| preferably $Li_2O$ | 0-<0.3 weight % |
| $Na_2O$ | >10-18 weight % |
| $K_2O$ | >0-8 weight % |
| preferably $K_2O$ | >0-<5 weight % |
| in particular $K_2O$ | >0-<4 weight %, whereby the |
| sum $Li_2O + Na_2O + K_2O$ is | >10-19 weight %, and |
| MgO | 0-6 weight % |
| CaO | 5-<12 weight % |
| SrO | 0-5 weight % |
| preferably SrO | 0-<0.5 weight % |
| BaO | 0-12 weight % |
| preferably BaO | >1-12 weight % |
| more preferably BaO | >1-<3.5 weight % |
| whereby the | |
| sum MgO + CaO + SrO + BaO is | 5-19 weight %, and |
| F | 0-3 weight % |
| $TiO_2$ | 0-10 weight % |
| preferably $TiO_2$ | >0.1-10 weight % |
| $Fe_2O_3$ | 0-0.5 weight % |
| $ZrO_2$ | >0.5-9 weight % |
| $CeO_2$ | 0-3 weight % |
| $WO_3$ | 0-3 weight % |
| $Bi_2O_3$ | 0-3 weight % |
| $MoO_3$ | 0-3 weight %. |

DETAILED DESCRIPTION OF THE INVENTION

The present invention provides an alumino-silicate glass, comprising or consisting of the following glass composition (in weight % on oxide basis):

| | |
|---|---|
| $SiO_2$ | 49-69 weight % |
| preferably $SiO_2$ | 49-<59 weight % |
| $B_2O_3$ | 0-2 weight % |
| preferably $B_2O_3$ | 0 weight % |
| $Al_2O_3$ | >4.7-15 weight % |
| preferably $Al_2O_3$ | >5-15 weight % |
| $Li_2O$ | 0-4 weight % |
| preferably $Li_2O$ | 0-<0.3 weight % |
| $Na_2O$ | >10-18 weight % |
| $K_2O$ | >0-8 weight % |
| preferably $K_2O$ | >0-<5 weight % |
| in particular $K_2O$ | >0-<4 weight %, whereby the |
| sum $Li_2O + Na_2O + K_2O$ is | >10-19 weight %, and |
| MgO | 0-6 weight % |
| CaO | 5-<12 weight % |
| SrO | 0-5 weight % |
| preferably SrO | 0-<0.5 weight % |
| BaO | 0-12 weight % |
| preferably BaO | >1-12 weight % |
| more preferably BaO | >1-<3.5 weight % |
| whereby the | |
| sum MgO + CaO + SrO + BaO is | 5-19 weight-%, and |
| F | 0-3 weight % |
| $TiO_2$ | 0-10 weight % |
| preferably $TiO_2$ | >0.1-10 weight % |
| $Fe_2O_3$ | 0-0.5 weight % |
| $ZrO_2$ | >0.5-9 weight % |
| $CeO_2$ | 0-3 weight % |
| $WO_3$ | 0-3 weight % |
| $Bi_2O_3$ | 0-3 weight % |
| $MoO_3$ | 0-3 weight %. |

Conventional refining agents, for example sulfates, chloride, $Sb_2O_3$, $As_2O_3$, $SnO_2$ can be added to the above glass/glass melt.

The composition of the inventive alumino-silicate glasses is preferably in a range of (that is, the alumino-silicate glass of the present invention comprises one of the following glass compositions (in weight % on oxide basis) or consists thereof):

| | |
|---|---|
| $SiO_2$ | 49-69 weight % |
| preferably $SiO_2$ | 49-58.5 weight % |
| $B_2O_3$ | 0 weight % |
| $Al_2O_3$ | >4.7-14 weight % |
| preferably $Al_2O_3$ | >5-14 weight % |
| $Li_2O$ | 0-4 weight % |
| preferably $Li_2O$ | 0-<0.3 weight % |
| $Na_2O$ | >10-18 weight % |
| $K_2O$ | >0-8 weight % |
| preferably $K_2O$ | >0-<5 weight % |
| in particular $K_2O$ | >0-<4 weight %, whereby the |
| sum $Li_2O + Na_2O + K_2O$ is | >10-19 weight %, and |
| MgO | 0-5 weight % |
| CaO | 7-<12 weight % |
| SrO | 0-5 weight % |
| preferably SrO | 0-<0.5 weight % |
| BaO | 0-10 weight-%, |
| preferably BaO | >1-10 weight % |
| more preferably BaO | >1-<3.5 weight %, whereby the |
| sum MgO + CaO + SrO + BaO is | 7-19 weight %, and |
| F | 0-3 weight % |
| $TiO_2$ | 0-5 weight % |
| preferably $TiO_2$ | >0.5-5 weight % |
| $Fe_2O_3$ | 0-0.5 weight % |
| $ZrO_2$ | >1-9 weight % |
| $CeO_2$ | 0-3 weight % |
| $WO_3$ | 0-3 weight % |
| $Bi_2O_3$ | 0-3 weight % |
| $MoO_3$ | 0-3 weight %. |

Conventional refining agents, for example sulfates, chloride, $Sb_2O_3$, $As_2O_3$, $SnO_2$ can be added to the above glass/glass melt.

The composition of the inventive alumino-silicate glasses is furthermore preferably in a range of (that is, the alumino-silicate glass of the present invention comprises one of the following glass compositions (in weight % on oxide basis) or consists thereof):

| | |
|---|---|
| $SiO_2$ | 49-66 weight % |
| preferably $SiO_2$ | 49-58.5 weight % |
| $Al_2O_3$ | >4.7-14 weight % |
| preferably $Al_2O_3$ | >5-14 weight % |
| $Na_2O$ | >11-18 weight % |
| $K_2O$ | >0.5-8 weight % |
| preferably $K_2O$ | >0.5-<5 weight %, |
| in particular $K_2O$ | >0.5-<4 weight %, whereby the |
| sum $Na_2O + K_2O$ is | >11-19 weight %, and |
| MgO | 0.1-3 weight % |
| CaO | 7-<12 weight % |
| BaO | >1-9 weight % |
| preferably BaO | 1.5-<3.5 weight %, whereby the |
| sum MgO + CaO + BaO is | 8.2-19 weight %, and |
| F | 0-3 weight % |
| $TiO_2$ | 0-5 weight % |
| preferably $TiO_2$ | >0.5-5 weight % |
| $Fe_2O_3$ | 0-0.5 weight % |
| $ZrO_2$ | >1-9 weight % |
| $CeO_2$ | 0-3 weight % |
| $WO_3$ | 0-3 weight % |
| $Bi_2O_3$ | 0-3 weight % |
| $MoO_3$ | 0-3 weight %, | whereby the glass contains no $B_2O_3$, no $Li_2O$ and no SrO.

Conventional refining agents, for example sulfates, chloride, $Sb_2O_3$, $As_2O_3$, $SnO_2$ can be added to the above glass/glass melt.

Accordingly, the object of this invention is an alumino-silicate glass which can be used as an alternative to a soda lime glass, since it not only comprises to a great extent its advantageous characteristics but beyond that, also provides additional advantageous characteristics. The inventive glasses have a clearly higher transformation temperature Tg in the range of 580° C. to 640° C. than conventional soda lime glasses. At the same time a similar or only slightly higher processing temperature (VA) in the range of 1065° C. to 1140° C. is obtained compared to soda lime glasses which normally have a processing temperature in the range of 1030° C. to 1140° C. In addition the thermal expansion of approximately 8 to $10 \times 10^{-6}$/K (thermal heat expansion coefficient) in the temperature range of 20 to 300° C. which is characteristic for soda lime glasses is obtained from the inventive glasses.

In order to be able to change these characteristics, in particular a high expansion, a high transformation temperature Tg and a low processing temperature, the glass contains large amounts of $Na_2O$ of >10 weight %, preferably >12 weight %. Also for special applications of the inventive glasses as substrate glasses, for example as CIGS-substrate glasses—that is copper-indium-galliun sulfide and/or selenium-substrate glasses—a $Na_2O$ content of >10 weight % is a fundamental characteristic. Sodium provides hereby a significant contribution in increasing the level of efficiency in that Na-ions can diffuse into the CIGS-layer. The high sodium content contributes therefore decisively to the inventively desired high expansion and a high Tg-value being achieved at simultaneous low processing temperatures.

Within the context of the invention it is moreover important that the CaO contents in the glass according to the invention are in a range of 5 to <12 weight % and $ZrO_2$ are in the range of 0.5 to 9 weight %. The desired characteristics of the glass can be realized to an especially great extent if the quotient (weight %) of $Na_2O/(MgO+CaO+ZrO_2)$ is set in the range of 0.5 to 0.9, preferably in the range of 0.6 to 0.9, especially preferably in the range of 0.6 to 0.8. By setting the quotient of $Na_2O/(MgO+CaO+ZrO_2)$ within the described range—in particular due to the high $Na_2O$ content of >10 weight %, or respectively >12 weight % —the thermal expansion or respectively the thermal expansion coefficient (coefficient of thermal expansion, CTE) can very successfully be kept in the range of the soda lime glasses and the processing temperature lowered into the range of soda lime glasses.

The invention relates therefore to a process of selecting an alumino-silicate glass having a thermal expansion coefficient in the range of 8 to $10 \times 10^{-6}$/K in a temperature range of 20 to 300° C., a transformation temperature Tg in a range of 580° C. to 640° C., and a processing temperature VA in a range of 1065° C. to 1140° C., whereby the glass composition is selected so that the quotient (weight %) of $Na_2O/(MgO+CaO+ZrO_2)$ is in the range of 0.5 to 0.9, preferably in the range of 0.6 to 0.9, especially preferably in the range of 0.6 to 0.8.

According to the invention it was moreover determined that by monitoring the sum $MgO+CaO+ZrO_2$ it is possible to obtain a so-called "short glass", whereby the difference between processing temperature and transformation temperature Tg becomes as small as possible, but that at the same time a relatively high transformation temperature Tg is achieved. According to the invention it is especially advantageous therefore if the sum of $MgO+CaO+ZrO_2$ is in a range of 10 to 20 weight %, more preferably in a range of 14 to <19 weight %.

According to the invention alumino-silicate glasses are therefore utilized. These include as main components $SiO_2$ and $Al_2O_3$, as well as alkali- and earth alkali-oxides and possibly additional components.

The base glass contains normally preferably at least 49 weight %, preferably at least 50 weight %, particularly preferably at least 52 weight % of $SiO_2$. The maximum amount of $SiO_2$ is 69 weight % $SiO_2$. An especially preferred range of the $SiO_2$ content is 49 to <59 weight %, in particular 49 to 58.5 weight %. If the content is too low, that is a $SiO_2$ content of below 49 weight %, the chemical stability of the glass deteriorates. The crystallization tendency of the glass clearly increases with higher amounts, especially with a $SiO_2$ content of 59 weight % or above. In the especially preferred range the crystallization stability and the chemical stability of the glass is especially facilitated, so that compared to glasses having a higher $SiO_2$ content, a reduced crystallization susceptibility exists.

The amount of $Al_2O_3$ is at least 4.7 weight %, especially preferably >4.7 weight %, more especially preferred >5 weight %. The $Al_2O_3$ content is especially preferred at ≤15 weight %, preferably ≤14% and in an especially preferred design form ≤10 weight % in order to provide good meltability. More especially preferred are ranges of >5 to 14 weight %, in particular ranges of 8 to 12 weight %. The content can be varied depending on the application purpose. Exceeding the $Al_2O_3$ content of 15 weight % has the disadvantage of impaired meltability. Falling below an $Al_2O_3$ content of 4 weight % has the disadvantage that the chemical stability of the glass is deteriorated and the tendency toward crystallization increases.

Of the alkali oxides lithium, sodium and potassium, sodium is of substantial importance, as already explained. According to the invention $Na_2O$ is contained in an amount of >10 to 18 weight %, in particular in an amount of >11 to 18 weight %, even more preferably in an amount of >12 to 18 weight %. The $K_2O$ content is >0 to 8 weight %, preferably >0 to <5 weight %, more preferably >0 to <4 weight %. According to the invention the $Li_2O$ content is 0 to 4 weight %, more preferably 0 to 1.5 weight %, particularly preferably 0 to <0.3 weight %. The addition of $Li_2O$ can facilitate adjustment of the thermal expansion (CTE) and reduction of the processing temperature.

However, the $Li_2O$ content is especially preferred at <0.3 weight %, or the glass is completely $Li_2O$ free. To date there is no indication that $Li_2O$ would act similar to $Na_2O$ since its diffusion is presumably too high. $Li_2O$ is moreover too expensive as a raw material, so that it is advantageous to use smaller amounts.

Exceeding the respectively stated alkali-oxide content brings the disadvantage that the corrosion of an existing glass contact material deteriorates. Falling short of the respectively stated alkali-oxide content brings the disadvantage that the meltability deteriorates.

The sum $Li_2O+Na_2O+K_2O$ is in a range of >10 to 19 weight %, more preferably in a range of >12 to 19 weight %.

Calcium, magnesium, barium in particular find use as earth alkali-oxides and to a somewhat lesser extent also strontium.

CaO is added in a range of 5 to <12 weight %, preferably 6 to <12 weight %, more preferably 7 to <12 weight %, particularly preferably 8 to <12 weight %. MgO is added in a range of 0 to 6 weight %, preferably 0 to 5 weight %, more preferably 0.1 to 3 weight %, particularly preferably 0.5 to 2 weight %. MgO can be used to improve the crystallization stability and to increase the transformation temperature Tg. However, MgO may also be omitted completely of the inventive glass composition (MgO=0 weight %).

BaO is added in a range of 0 to 12 weight %, preferably >1 to 12 weight %, more preferably >1 to 10 weight %, even more preferably 1.5 to 9 weight %, particularly preferably 1.5 to <3.5 weight %. The addition of BaO can be used to increase the transformation temperature Tg of the glass composition. The advantages of a low BaO content are essentially the lower density and thereby the weight reduction of the glass, as well as cost savings of the expensive components. The lower density is advantageous, especially when transporting the glass to a converter, especially if the products manufactured from the glass, such as lamps are installed in portable devices. The weight reduction of the glass is preferably >2% (at a BaO content in a range of 3 to <4 weight %), especially preferably >5% (at a BaO content in a range of 2 to 3 weight %). An additional advantage of a BaO-poor glass is also that barium-ions which—for example in the form of soluble barium-compounds—can be classified as being toxic can be reduced or completely omitted. Reducing the BaO component moreover results in a clear cost advantage, since BaO is relatively expensive, which accumulates in large-scale production of glass.

Surprisingly it has now been shown that the previously described advantages for the glass according to the invention are only of secondary importance since an addition of relatively small amounts of barium oxide, for example >1 weight % contribute to an unexpected increase in the crystallization stability of the glass composition, thus facilitating large-scale production. The total content of BaO is hereby preferably >1 to 12 weight %, more preferably >1.5 to 12 weight %, in order to ensure improved crystallization stability. Omitting BaO leads to disadvantages in the crystallization properties, so that as a rule, sufficient devitrification cannot be achieved.

Completely surprisingly it was noted that an addition of BaO has no negative effect upon the diffusion of the sodium ions. This is in contrast to the descriptions in US 2005/0003136 A1, wherein barium-oxide is supposed to have a negative effect on the sodium diffusion. On the contrary, no impairment of the effectiveness of, for example a CIGS-cell when utilizing the glass according to the invention in the form of a substrate glass having a BaO content of >1 weight % was observed.

It has proven to be particularly advantageous if in addition to a $SiO_2$ content in a range of 49 to 58.5 weight %, the BaO content was set in a range of 1.5 to 12 weight %. The tendency of the glass toward crystallization is hereby clearly reduced, so that the danger of devitrification is reduced and crystallization effects can herewith be extensively avoided.

In the glass according to the invention, SrO is present in a range of 0 to 5 weight %, preferably 0 to <2.5 weight %, particularly in a range of 0 to <0.5 weight %. SrO generally serves to increase the transformation temperature Tg of the glass. SrO can also be omitted from the glass composition according to the invention (SrO=0 weight %). Especially disadvantageous effects, as maintained in the current state of the art could hereby not be observed. It can however be advantageous if SrO is present to improve the crystallization stability, preferably with at least 0.1 weight %.

According to the invention the sum of MgO+CaO+SrO+BaO is in a range of 5 to 19 weight %, preferably in a range of 7 to 19 weight %, more preferably in a range of 8.2 to 19 weight %.

According to the invention $B_2O_3$ is present in an amount of 0 to 2 weight %, more preferably 0 to 1 weight %, especially preferably 0 to 0.5 weight %. According to an especially preferred design form the glass contains no $B_2O_3$. This is preferred since $B_2O_3$ is on the one hand toxicologically questionable (teratogen or fruit-damaging) and on the other hand is an expensive component, significantly raising the batch cost. Higher contents of $B_2O_3$ also have the disadvantage that they evaporate during glass melting, settle negatively in the exhaust region and generally change the glass composition. The addition of $B_2O_3$ is moreover disadvantageous in special applications. It has been shown that a $B_2O_3$ content of more than 1 weight % in a substrate glass has a negative effect on the efficiency of a thin-film solar cell, since boron atoms from the substrate glass get into the semiconductor layer—due to evaporation or diffusion—where they will probably cause defects which are electrically active and due to increased recombination reduce the efficiency of the cell.

Furthermore, $ZrO_2$ is contained in an amount of >0.5 to 9 weight %, preferably >1 to 9 weight %, particularly >4 to 9 weight %.

Moreover, other components, for example $WO_3$, $MoO_3$, $Bi_2O_3$, $CeO_2$, $TiO_2$, $Fe_2O_3$, ZnO, F and/or $Cs_2O$ or also additional components may be present, independent of each other.

$WO_3$, $MoO_3$, $Bi_2O_3$ are contained in the alumino-silicate glasses according to the invention independent from each other, respectively in amounts of 0 to 3 weight %. These components serve preferably to adjust the UV-edge of the glass and can also be used as redox-buffer in refining.

$TiO_2$ and also $CeO_2$ can normally be added for UV-blocking of the glass. Depending on the application the glass according to the invention can for example be in the form of cover glass/cladding tube and be doped for example with $TiO_2$ and/or $CeO_2$ in order to keep away harmful UV-radiation from components located underneath the glass. According to the invention the $TiO_2$ content is in a range of 0 to 10 weight %, preferably in a range of 0.1 to 10 weight %, more preferably in a range of 0.1 to 5 weight %. However, a content of 0.1 to 2 weight %, in particular >0.1 to 2 weight % is especially preferred, since then toxic refining agents such as $As_2O_3$ and $Sb_2O_3$ can be completely omitted. According to the invention $CeO_2$ is in a range of 0 to 3 weight %.

$Fe_2O_3$ is utilized in an amount of 0 to 0.5 weight % and normally serves to adjust UV-blocking, and can however also be used as a redox-buffer in refining.

Moreover, fluorine in the form of fluorides, for example NaF can be added to the glass according to the invention to improve the meltability. The amount added to the glass composition is in a range of 0 to 3 weight %.

With the exception of unavoidable contaminants, the alumino-silicate glasses according to the invention should be free of niobium oxide.

Surprisingly it has been found that individual components of the inventive glass composition which were described as essential in extensive parts of the current state of the art can be clearly reduced or even completely omitted. These are the components: $B_2O_3$, $Li_2O$ and SrO. In spite of the absence of $B_2O_3$, $Li_2O$ and SrO the desired characteristics of the alumino-silicate glass according to the invention can unexpectedly be provided as an improved alternative for a soda lime glass.

Conventional refining agents can be used if they do not negatively influence the chemical and physical characteristics of the inventive glass composition. Refining with sulfates, chlorides, $Sb_2O_3$, $As_2O_3$ and/or $SnO_2$ is possible for example. The refining agents themselves are preferably contained in the glass in an amount of respectively >0 to 1 weight %, whereby the minimum content is preferably 0.1, in particular 0.2 weight %.

Methods for the production of $SiO_2$ glasses are known. The suitable raw materials and process conditions in the production of glass, such as the atmosphere in the melting furnace, the melting time and the melting temperature can be easily selected and adjusted by the expert within the state of the art.

The glass may be produced in any desired embodiment, for example as flat glass, tube glass, block glass, fiber glass, rod-shaped glass, for example round, oval, textured or not.

The described glasses are suitable for example for the production of flat glass, especially according to the float process. Moreover, the glasses are suitable for the production of tube glass, wherein the Danner-process is especially preferred. However, production of tube glass is also possible according to the Vello process or the A-draw process. Glass tubes having a diameter for example of at least 0.5 mm, in particular at least 1 mm and an upper limit of 3 cm maximum, in particular 1 cm maximum can also be produced. Especially preferred tube diameters are between 2 mm and 5 mm. It has been shown that tubes of this type have a wall thickness of at least 0.05 mm, in particular at least 0.1 mm, whereby at least 0.2 mm is preferred. Maximum wall thicknesses are 1 mm at most, whereby wall thicknesses of <0.8 mm or <0.7 mm maximum are preferred.

The object of the invention is also the use of the inventive alumino-silicate glasses. Preferred applications are in the field of the electrical industry, for example in glass-metal fusing, in semiconductor applications, for example as substrate glasses for display applications, or in the solar technology as substrate glasses for solar applications of all types.

One important area of application of the glasses according to the invention is for example in fusing of glasses to metals and alloys which have a relatively high thermal expansion in the range of 8 to $10 \times 10^{-6}$/K and in whose application a higher thermal stability is required than can be realized with conventional soda lime glasses. These are for example applications in the lamp industry where thermally stable electrode lead-ins are required. The inventive glasses can therefore be used in particular when using so-called Dumet-alloys with high thermal expansions in the range of 8 to $10 \times 10^{-6}$/K.

Especially suitable applications are for example in the area of gas discharge lamps, in particular fluorescent lamps, such as CCFL, HCFL and similar lamps, in areas for example of back lighting for TFT displays or also for widely varying lighting requirements ("general lighting") where cheaper electrode lead-ins such as Dumet-alloys compared to expensive electrode lead-ins, for example tungsten electrode lead-ins, with a lower expansion of approximately 3 to $5 \times 10^{-6}$/K are to be used.

An additional interesting application for the inventive glasses is in the field of displays, for example for PDPs, in particular as substrate glasses. In regard to material engineering the demands on substrate glasses for PDPs are such that in addition to a required transparency, the adaption to the expansion characteristic of the most widely used fluorescent colorant is essential. Therefore, the thermal expansion alpha20/300 of the glass should be in the range of conventional window glass, in other words in the range of 8 to $9 \times 10^{-6}$/K. This provision is met by the glasses according to the invention.

Moreover, the glasses according to the invention are particularly suitable for such electronic applications where high temperature stability is important. This clearly increases the application possibilities of the glasses.

The glasses according to the invention are also particularly suitable in solar applications, especially for such applications where a glass having a high thermal expansion and relatively high temperature stability (process stability) is required, whereby however, hot forming of the glass should occur at as low as possible temperatures (a so-called "short glass"). The process temperature (VA) of the glass should hereby be as low as possible in order to allow for cost effective production of these glasses. In the current invention the processing temperature (VA) is the temperature at which the glass has a viscosity $\eta$ of $\eta = 10^4$ dPas. Depending on the glass composition the processing temperature VA at which a viscosity of $\eta = 10^4$ dPas is achieved can vary. The glasses according to the invention fulfill these requirements to a high degree and are therefore especially suitable for applications of this type.

The inventive glasses are particularly suitable as substrate glass/superstrate glass or also as cover glass in the field of semiconductor technology, in particular for the thin-film photovoltaic, comprising layers containing cadmium and/or tellurium in metallic and/or oxidic form, or containing copper, indium, gallium, sulfur and/or selenium in metallic and/or oxidic form. Superstrates are substrate glasses whereby the substrate glass also functions as cover glass in a quasi-fashion, since in thin-layer photovoltaic the coated glass is "inverted" and the layer is on the underside and the light strikes through the substrate glass onto the photovoltaic layer.

The glasses according to the invention are especially suited for technologies on the basis of Cd—Te, the various thin-layer silicon technologies, such as a-Si, amorphous-crystalline and also pure crystalline silicon, as well as for technologies which are based on copper-indium-gallium-sulfide-selenium, so-called CIS or CIGS. CIGS identifies $Cu(In_{1-x}, Ga_x)(S_{1-y}, Se_y)_2$ and is a known thin-film technology for solar cells and is an abbreviation for the used elements of copper, indium, gallium, sulfur and selenium. Important examples are $Cu(In,Ga)Se_2$ (copper-indium-gallium-diselenium) or $CuInS_2$ (copper-indium-disulfide). These materials distinguish themselves in particular in that they absorb the sunlight effectively as direct semiconductors already in a relatively thin layer of few μm. Deposition of such thin photoactive layers requires high processing temperatures in order to achieve high degrees of efficiency. Typical temperatures are in the range of 450 to 600° C., whereby the maximum temperature is limited by the substrate. For large area applications, gas is frequently used as known. In order that the thermal expansion coefficient (CTE) is adapted to the semiconductor layers, floated soda lime glass has hitherto been used as substrate, as disclosed for example in DE 43 33 407 and WO 94/07269. As already explained soda lime glass has a transformation temperature of approximately 525° C. and therefore limits all fabrication processes to approximately 500° C. Otherwise so-called warpage would occur and the glass begins to distort. This applies even more the larger the substrate to be coated is, and the closer the process temperature comes to the transformation temperature Tg of the glass. Warpages and distortions of the substrate lead to problems particularly with inline-processes or—lines, thereby drastically reducing throughput and yield.

The glasses according to the invention are also particularly suited for Cd—Te or CIS or CIGS photovoltaic applications, especially as substrate and/or superstrate glass and/or cover glass. CIS hereby refers to copper-indium sulfide and/or selenium and CIGS to copper-indium-gallium sulfide and/or selenium.

The inventive glasses therefore represent an alternative to soda lime glasses, especially in this field of application and can replace these advantageously, since for deposition of semiconductor layers higher processing temperatures can be used than with conventional soda lime glasses, without the substrate deforming in an disadvantageous manner. A desired higher temperature during the coating process moreover leads to higher deposition rates and to very good crystalline quality of the produced layers.

So that there is no peeling off of the semiconductor layers during cooling after the application it is advantageous if the substrate glass continues to be adapted to the thermal expansion of the back contact material of the solar cell, for example molybdenum (approximately $5 \times 10^{-6}$/K) and to the semiconductors applied thereto (for example approximately $8.5 \times 10^{-6}$/K for CIGS). This applies also to the inventive glasses.

The glasses according to the invention are therefore especially suited to solar technology, preferably for solar cells, in particular thin-film solar cells on the basis of silicon or on the basis of compound semiconductor material, such as CdTe, CIS or CIGS. The glasses according to the invention therefore find particular application as thin-film solar cell substrates or superstrates or cover glasses. Substantially less photoactive material is hereby required for a conversion of sunlight for electricity than with conventional crystalline silicon-based solar cells. The low semiconductor material usage and the high automation in the production result in clear cost reductions with this technology.

An additional advantage in the use of the inventive glasses in the solar technology is their high sodium content. It is known that sodium can be built into a semiconductor thereby increasing the degree of efficiency of a solar cell due to improved chalcogen-incorporation in the crystal structure of the semiconductor. In addition to the characteristic as a carrier, the substrate glass can also serve to support the targeted release of soda ions/-atoms into the semiconductor.

The inventive glasses are especially well suited for the above applications since processing/deposition compared to the traditionally used soda lime glasses can occur at higher temperatures due to higher temperature stability, which provides great advantages. One criterion for this is the so-called transformation temperature Tg. On the other hand no especially high temperatures are required for the melting and hot forming process of the glass, thus enabling cost-effective production.

The current invention is explained below with reference to examples which illustrate the idea of the invention, which however are not intended to restrict same.

EXAMPLES

Inventive glass compositions were selected from which glasses were produced. 4-liter platinum crucibles were used for melting into which the raw materials were added over 8 hours at a melting temperature of 1580° C. and were kept there at this temperature for 14 hours. While stirring, the glass melt was then cooled within 8 hours to 1400° C. and was then poured into graphite forms which were preheated to 500° C. After pouring the mold is placed in an annealing furnace which was preheated to 650° C. and which was cooled down at 5° C./hour to room temperature.

The compositions and characteristics of the glasses according to the invention are summarized in the following tables 1 and 2.

TABLE 1

|  | A1 | A2 | A3 |
|---|---|---|---|
| $SiO_2$ | 58.45 | 57.90 | 54.00 |
| $B_2O_3$ | | | |
| $Al_2O_3$ | 10.20 | 9.90 | 9.88 |
| $Li_2O$ | | | |
| $Na_2O$ | 11.50 | 11.00 | 11.00 |
| $K_2O$ | 4.48 | 4.17 | 3.05 |
| MgO | 0.02 | 1.50 | |
| CaO | 8.50 | 7.00 | 10.87 |
| BaO | 1.50 | 2.00 | 4.00 |
| $ZrO_2$ | 5.35 | 6.53 | 7.20 |
| $TiO_2$ | | | |
| $CeO_2$ | | | |
| F | | | |
| $SO_3$ | | | |
| $As_2O_3$ | | | |
| Sum | 100.00 | 100.00 | 100.00 |
| alpha | 9.40 | 8.90 | 9.11 |
| Tg | 590 | 602 | 611 |
| VA | 1090 | 1110 | 1091 |
| Density | | | |
| $Na_2O/(MgO + CaO + ZrO_2)$ | 0.80 | 0.73 | 0.61 |
| $MgO + CaO + ZrO_2$ | 14.4 | 15.0 | 18.07 |
| Crystallization stability | + | + | + |

TABLE 2

|  | A4 | A5 |
|---|---|---|
| $SiO_2$ | 51.50 | 54.10 |
| $B_2O_3$ | | |
| $Al_2O_3$ | 13.00 | 9.50 |
| $Li_2O$ | | |
| $Na_2O$ | 10.60 | 12.60 |
| $K_2O$ | 0.50 | |
| MgO | 1.40 | 1.50 |
| CaO | 10.50 | 8.30 |
| BaO | 11.10 | 9.00 |
| $ZrO_2$ | 1.40 | 5.00 |
| $TiO_2$ | | |
| $CeO_2$ | | |
| F | | |
| $SO_3$ | | |
| $As_2O_3$ | | |
| Sum | 100.00 | 100.00 |
| Alpha | | |
| Tg | | |
| VA | | |
| Density | | |
| $Na_2O/(MgO + CaO + ZrO_2)$ | 0.81 | 0.86 |
| $MgO + CaO + ZrO_2$ | 13.3 | 14.8 |
| Crystallization stability | + | + |

Alpha . . . thermal heat expansion coefficient at 20 to 300° C. [×10$^{-6}$ K$^{-1}$]
Tg . . . Transformation temperature [° C.]
VA . . . Processing temperature, whereby the viscosity is at 10$^4$ dPas [° C.]
Density . . . [g/m$^3$]
Crystallization stability:
+ . . . good
○ . . . medium
− . . . poor The current invention describes for the first time glass compositions which provide an alternative to soda lime glasses which have a similar thermal expansion of approximately 8 to 10×10$^{-6}$/K, which however have a higher thermal resistance (Tg) and at the same time have similar or only slightly higher processing temperatures (VA) compared to soda lime glasses.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An alumino-silicate glass, comprising:
one of a following plurality of glass compositions (in weight % on an oxide basis):

| | |
|---|---|
| $SiO_2$ | 49-<59 weight % |
| $B_2O_3$ | 0 weight % |
| $Al_2O_3$ | >5-15 weight % |
| $Li_2O$ | 0-<0.3 weight % |
| $Na_2O$ | >10-18 weight % |
| $K_2O$ | >0-<5 weight %, wherein the |
| sum $Li_2O + Na_2O + K_2O$ is | >10-19 weight %, and |
| MgO | 0-6 weight % |
| CaO | 5-<12 weight % |
| SrO | 0 weight % |
| BaO | >1-<3.5 weight % |
| wherein the | |
| sum MgO + CaO + SrO + BaO is | 5-19 weight %, and |
| F | 0-3 weight % |
| $TiO_2$ | >0.1-10 weight % |
| $Fe_2O_3$ | 0-0.5 weight % |
| $ZrO_2$ | >0.5-9 weight % |
| $CeO_2$ | 0-3 weight % |
| $WO_3$ | 0-3 weight % |
| $Bi_2O_3$ | 0-3 weight % |
| $MoO_3$ | 0-3 weight %. | wherein the alumino-silicate glass is selected so that a quotient (weight %) of $Na_2O/(MgO+CaO+ZrO_2)$ is in a range of 0.5 to 0.9.

2. The alumino-silicate glass according to claim 1, wherein the alumino-silicate glass consists of one of said plurality of glass compositions.

3. The alumino-silicate glass according to claim 1, wherein said plurality of glass compositions (in weight % on said oxide basis) is:

| | |
|---|---|
| $SiO_2$ | 49-69 weight % |
| $B_2O_3$ | 0 weight % |
| $Al_2O_3$ | >4.7-14 weight % |
| $Li_2O$ | 0-4 weight % |
| $Na_2O$ | >10-18 weight % |
| $K_2O$ | >0-8 weight %, wherein the |
| sum $Li_2O + Na_2O + K_2O$ is | >10-19 weight %, and |
| MgO | 0-5 weight % |
| CaO | 7-<12 weight % |
| SrO | 0 weight % |
| BaO | >1-10 weight % |
| wherein the | |
| sum MgO + CaO + SrO + BaO is | 7-19 weight %, and |
| F | 0-3 weight % |
| $TiO_2$ | 0-5 weight % |
| $Fe_2O_3$ | 0-0.5 weight % |
| $ZrO_2$ | >1-9 weight % |
| $CeO_2$ | 0-3 weight % |
| $WO_3$ | 0-3 weight % |
| $Bi_2O_3$ | 0-3 weight % |
| $MoO_3$ | 0-3 weight %. |

4. The alumino-silicate glass according to claim 3, wherein $K_2O$ is >0-<4 weight %.

5. The alumino-silicate glass according to claim 1, wherein the alumino-silicate glass has a thermal expansion coefficient in a range of 8 to $10 \times 10^{-6}$/K in a temperature range of 20 to 300° C., a transformation temperature Tg in a range of 580° C. to 640° C., and a processing temperature VA in a range of 1065° C. to 1140° C.

6. The alumino-silicate glass according to claim 1, wherein the alumino-silicate glass is selected so that said quotient (weight %) of $Na_2O/(MgO+CaO+ZrO_2)$ is in a range of 0.6 to 0.9.

7. The alumino-silicate glass according to claim 6, wherein said quotient (weight %) of $Na_2O/(MgO+CaO+ZrO_2)$ is in a range of 0.6 to 0.8.

8. The alumino-silicate glass according to claim 1, wherein a sum of $MgO+CaO+ZrO_2$ is in a range of 10 to 20 weight %.

9. The alumino-silicate glass according to claim 1, wherein said sum of $MgO+CaO+ZrO_2$ is in a range of 14 to <19 weight %.

10. The alumino-silicate glass according to claim 1, wherein, with an exception of unavoidable contaminants, the alumino-silicate glass contains no $B_2O_3$ and no $Li_2O$.

11. The alumino-silicate glass according to claim 1, wherein said plurality of glass compositions (in weight % on said oxide basis) is:

| | |
|---|---|
| $SiO_2$ | 49-58.5 weight % |
| $B_2O_3$ | 0 weight % |
| $Al_2O_3$ | >5-14 weight % |
| $Li_2O$ | 0-<0.3 weight % |
| $Na_2O$ | >10-18 weight % |
| $K_2O$ | >0-<5 weight %, wherein the |
| sum $Li_2O + Na_2O + K_2O$ is | >10-19 weight %, and |
| MgO | 0-5 weight % |
| CaO | 7-<12 weight % |
| SrO | 0 weight % |
| BaO | >1-<3.5 weight % |
| wherein the | |
| sum MgO + CaO + SrO + BaO is | 7-19 weight %, and |
| F | 0-3 weight % |
| $TiO_2$ | >0.5-5 weight % |
| $Fe_2O_3$ | 0-0.5 weight % |
| $ZrO_2$ | >1-9 weight % |
| $CeO_2$ | 0-3 weight % |
| $WO_3$ | 0-3 weight % |
| $Bi_2O_3$ | 0-3 weight % |
| $MoO_3$ | 0-3 weight %. |

12. The alumino-silicate glass according to claim 1, wherein said plurality of glass compositions (in weight % on said oxide basis) is:

| | |
|---|---|
| $SiO_2$ | 49-66 weight % |
| $Al_2O_3$ | >4.7-14 weight % |
| $Na_2O$ | >11-18 weight % |
| $K_2O$ | >0.5-8 weight %, wherein the |
| sum $Na_2O + K_2O$ is | >11-19 weight %, and |
| MgO | 0.1-3 weight % |
| CaO | 7-<12 weight % |
| BaO | >1-9 weight %, wherein the |
| sum MgO + CaO + BaO is | 8.2-19 weight %, and |
| F | 0-3 weight % |
| $TiO_2$ | 0-5 weight % |
| $Fe_2O_3$ | 0-0.5 weight % |
| $ZrO_2$ | >1-9 weight % |
| $CeO_2$ | 0-3 weight % |
| $WO_3$ | 0-3 weight % |
| $Bi_2O_3$ | 0-3 weight % |
| $MoO_3$ | 0-3 weight %, |

13. The alumino-silicate glass according to claim 12, wherein $K_2O$ is >0-<4 weight %.

14. The alumino-silicate glass according to claim 1, wherein said plurality of glass compositions (in weight % on said oxide basis) is:

| | |
|---|---|
| $SiO_2$ | 49-58.5 weight % |
| $Al_2O_3$ | >5-14 weight % |
| $Na_2O$ | >11-18 weight % |
| $K_2O$ | >0-<5 weight %, wherein the |
| sum $Na_2O + K_2O$ is | >11-19 weight %, and |
| MgO | 0.1-3 weight % |
| CaO | 7-<12 weight % |
| BaO | 1.5-<3.5 weight %, wherein the |
| sum MgO + CaO + BaO is | 8.2-19 weight %, and |
| F | 0-3 weight % |
| $TiO_2$ | >0.5-5 weight % |
| $Fe_2O_3$ | 0-0.5 weight % |
| $ZrO_2$ | >1-9 weight % |
| $CeO_2$ | 0-3 weight % |
| $WO_3$ | 0-3 weight % |

| | |
|---|---|
| $Bi_2O_3$ | 0-3 weight % |
| $MoO_3$ | 0-3 weight %, | wherein the alumino-silicate glass contains no $B_2O_3$, no $Li_2O$, and no SrO.

15. The alumino-silicate glass according to claim 1, wherein said plurality of glass compositions (in weight % on said oxide basis) is:

| | |
|---|---|
| $SiO_2$ | 49-69 weight % |
| $B_2O_3$ | 0-2 weight % |
| $Al_2O_3$ | >4.7-15 weight % |
| $Li_2O$ | 0-4 weight % |
| $Na_2O$ | >10-18 weight % |
| $K_2O$ | >0-8 weight %, wherein the |
| sum $Li_2O + Na_2O + K_2O$ is | >10-19 weight %, and |
| MgO | 0-6 weight % |
| CaO | 5-<12 weight % |
| SrO | 0 weight % |
| BaO | >1-12 weight % |
| wherein the | |
| sum MgO + CaO + SrO + BaO is | 5-19 weight %, and |
| F | 0-3 weight % |
| $TiO_2$ | 0-10 weight % |
| $Fe_2O_3$ | 0-0.5 weight % |
| $ZrO_2$ | >0.5-9 weight % |
| $CeO_2$ | 0-3 weight % |
| $WO_3$ | 0-3 weight % |
| $Bi_2O_3$ | 0-3 weight % |
| $MoO_3$ | 0-3 weight %, | wherein the alumino-silicate glass contains no $B_2O_3$, no $Li_2O$, and no SrO.

16. The alumino-silicate glass according to claim 15, wherein $K_2O$ is >0-<4 weight %.

17. The alumino-silicate glass according to claim 1, wherein the alumino-silicate glass contains a plurality of conventional refining agents.

18. The alumino-silicate glass according to claim 17, wherein said plurality of conventional refining agents includes at least one of a plurality of sulfates, chloride, $Sb_2O_3$, $As_2O_3$, and $SnO_2$.

19. A method of producing an alumino-silicate glass, said method comprising the steps of:
providing that the alumino-silicate glass includes a glass composition of one of a following plurality of glass compositions (in weight % on an oxide basis):

| | |
|---|---|
| $SiO_2$ | 49-<59 weight % |
| $B_2O_3$ | 0 weight % |
| $Al_2O_3$ | >5-15 weight % |
| $Li_2O$ | 0-<0.3 weight % |
| $Na_2O$ | >10-18 weight % |
| $K_2O$ | >0-<5 weight %, wherein the |
| sum $Li_2O + Na_2O + K_2O$ is | >10-19 weight %, and |
| MgO | 0-6 weight % |
| CaO | 5-<12 weight % |
| SrO | 0 weight % |
| BaO | >1-<3.5 weight % |
| wherein the | |
| sum MgO + CaO + SrO + BaO is | 5-19 weight %, and |
| F | 0-3 weight % |
| $TiO_2$ | >0.1-10 weight % |
| $Fe_2O_3$ | 0-0.5 weight % |
| $ZrO_2$ | >0.5-9 weight % |
| $CeO_2$ | 0-3 weight % |
| $WO_3$ | 0-3 weight % |
| $Bi_2O_3$ | 0-3 weight % |
| $MoO_3$ | 0-3 weight %. | the alumino-silicate glass having a thermal expansion coefficient in a range of 8 to $10 \times 10^{-6}$/K, a transformation temperature Tg in a range of 580° C. to 640° C., and a processing temperature VA in a range of 1065° C. to 1140° C.;
selecting said glass composition so that a quotient (weight %) of $Na_2O/(MgO+CaO+ZrO_2)$ is in a range of 0.5 to 0.9.

20. The method of claim 19, wherein the alumino-silicate glass consists of one of said plurality of glass compositions.

21. The method of claim 19, wherein said plurality of glass compositions (in weight % on said oxide basis) is:

| | |
|---|---|
| $SiO_2$ | 49-69 weight % |
| $B_2O_3$ | 0-2 weight % |
| $Al_2O_3$ | >4.7-15 weight % |
| $Li_2O$ | 0-4 weight % |
| $Na_2O$ | >10-18 weight % |
| $K_2O$ | >0-8 weight %, wherein the |
| sum $Li_2O + Na_2O + K_2O$ is | >10-19 weight %, and |
| MgO | 0-6 weight % |
| CaO | 5-<12 weight % |
| SrO | 0 weight % |
| BaO | >1-12 weight % |
| wherein the | |
| sum MgO + CaO + SrO + BaO is | 5-19 weight %, and |
| F | 0-3 weight % |
| $TiO_2$ | 0-10 weight % |
| $Fe_2O_3$ | 0-0.5 weight % |
| $ZrO_2$ | >0.5-9 weight % |
| $CeO_2$ | 0-3 weight % |
| $WO_3$ | 0-3 weight % |
| $Bi_2O_3$ | 0-3 weight % |
| $MoO_3$ | 0-3 weight %, |

22. The method of claim 21, wherein $K_2O$ is >0-<4 weight %.

23. The method of claim 19, wherein said quotient (weight %) of $Na_2O/(MgO+CaO+ZrO_2)$ is in a range of 0.6 to 0.9.

24. The method of claim 19, wherein said quotient (weight %) of $Na_2O/(MgO+CaO+ZrO_2)$ is in a range of 0.6 to 0.8.

25. A method of producing an alumino-silicate glass, said method comprising the steps of:
providing an alumino-silicate glass including one of a following plurality of glass compositions (in weight % on an oxide basis):

| | |
|---|---|
| $SiO_2$ | 49-69 weight % |
| $B_2O_3$ | 0-2 weight % |
| $Al_2O_3$ | >4.7-15 weight % |
| $Li_2O$ | 0-4 weight % |
| $Na_2O$ | >10-18 weight % |
| $K_2O$ | >0-8 weight %, wherein the |
| sum $Li_2O + Na_2O + K_2O$ is | >10-19 weight %, and |
| MgO | 0-6 weight % |
| CaO | 5-<12 weight % |
| SrO | 0 weight % |
| BaO | >1-12 weight % |
| wherein the | |
| sum MgO + CaO + SrO + BaO is | 5-19 weight %, and |
| F | 0-3 weight % |
| $TiO_2$ | 0-10 weight % |
| $Fe_2O_3$ | 0-0.5 weight % |
| $ZrO_2$ | >0.5-9 weight % |
| $CeO_2$ | 0-3 weight % |
| $WO_3$ | 0-3 weight % |
| $Bi_2O_3$ | 0-3 weight % |
| $MoO_3$ | 0-3 weight %, | wherein the alumino-silicate glass is selected so that a quotient (weight %) of $Na_2O/(MgO+CaO+ZrO_2)$ is in a range of 0.5 to 0.9.

26. The method of claim 25, further including using the alumino-silicate glass in a plurality of electronic applications where a high temperature stability of a plurality of glasses is required.

27. The method of claim 25, further including using the alumino-silicate glass for fusing with a plurality of metals and a plurality of alloys for a plurality of gas discharge lamps, wherein one of said plurality of metals and said plurality of alloys has a thermal expansion coefficient in a range of 8 to $10 \times 10^{-6}$/K.

28. The method of claim 27, wherein said plurality of gas discharge lamps is a plurality of fluorescent lamps.

29. The method of claim 27, wherein said plurality of gas discharge lamps are used at least one of in a field of back lighting of TFT displays and for illuminations ("general lighting").

30. The method of claim 25, further including using the alumino-silicate glass in a field of semiconductor technology as at least one of a substrate glass, a superstrate glass, and a cover glass having a plurality of layers one of (a) containing at least one of cadmium and tellurium in at least one of metallic and oxidic form, and (b) containing at least one of copper, indium, gallium, sulfur, and selenium in at least one of metallic and oxidic form.

31. The method of claim 25, further including using the alumino-silicate glass in a solar technology as at least one of a substrate glass, a superstrate glass, and a cover glass.

32. The method of claim 25, further including using the alumino-silicate glass in a solar technology for a plurality of solar cells as at least one of a substrate glass, a superstrate glass, and a cover glass.

33. The method of claim 32, wherein said plurality of solar cells is a plurality of thin-film solar cells.

34. The method of claim 25, further including using the alumino-silicate glass for one of Cd—Te, CIS, and CIGS photovoltaic applications as at least one of a substrate glass, a superstrate glass, and a cover glass.

35. The method of claim 25, further including using the alumino-silicate glass for one of Cd—Te, CIS, and CIGS thin-film photovoltaic applications as at least one of a substrate glass, a superstrate glass, and a cover glass.

* * * * *

UNITED STATES PATENT AND TRADEMARK OFFICE
CERTIFICATE OF CORRECTION

PATENT NO. : 8,828,897 B2
APPLICATION NO. : 13/408808
DATED : September 9, 2014
INVENTOR(S) : Fechner et al.

It is certified that error appears in the above-identified patent and that said Letters Patent is hereby corrected as shown below:

In the Claims

CLAIM 1
Column 13, line 1, cancel the table beginning with "$SiO_2$  49-<59 weight %" to and ending "$MoO_3$  0-3 weight %." in column 13, line 18, and insert the following table:

| | |
|---|---|
| $SiO_2$ | 49 - 69 weight % |
| $B_2O_3$ | 0 - 2 weight % |
| $Al_2O_3$ | >4.7 - 15 weight % |
| $Li_2O$ | 0 - 4 weight % |
| $Na_2O$ | > 12-18 weight % |
| $K_2O$ | >0 - 8 weight %, wherein the |
| sum $Li_2O+Na_2O+K_2O$ is | >12-19 weight %, and |
| MgO | 0 - 6 weight % |
| CaO | 5 - <12 weight % |
| SrO | 0 weight % |
| BaO | 0-12 weight % |
| wherein the | |
| sum MgO+CaO+SrO+BaO is | 5 - 19 weight %, and |
| F | 0 - 3 weight % |
| $TiO_2$ | 0 - 10 weight % |
| $Fe_2O_3$ | 0 - 0.5 weight % |
| $ZrO_2$ | >0.5 - 9 weight % |
| $CeO_2$ | 0 - 3 weight % |
| $WO_3$ | 0 - 3 weight % |
| $Bi_2O_3$ | 0 - 3 weight % |
| $MoO_3$ | 0 - 3 weight %, |

Signed and Sealed this
Twenty-ninth Day of March, 2016

Michelle K. Lee
*Director of the United States Patent and Trademark Office*

CLAIM 3

Column 13, line 30, cancel the table beginning with "SiO$_2$ 49-69 weight %" to and ending "MoO$_3$ 0-3 weight %." in column 13, line 47, and insert the following table:

| | |
|---|---|
| SiO$_2$ | 49 - <59 weight % |
| B$_2$O$_3$ | 0 weight % |
| Al$_2$O$_3$ | >5 - 15 weight % |
| Li$_2$O | 0 - <0.3 weight % |
| Na$_2$O | >12-18 weight % |
| K$_2$O | >0 - <5 weight %, wherein the |
| sum Li$_2$O+Na$_2$O+K$_2$O is | >12-19 weight %, and |
| MgO | 0 - 6 weight % |
| CaO | 5 - <12 weight % |
| SrO | 0 weight % |
| BaO | 0-10 weight % |
| wherein the | |
| sum MgO+CaO+SrO+BaO is | 5 - 19 weight %, and |
| F | 0 - 3 weight % |
| TiO$_2$ | >0.1 - 10 weight % |
| Fe$_2$O$_3$ | 0 - 0.5 weight % |
| ZrO$_2$ | >0.5 - 9 weight % |
| CeO$_2$ | 0 - 3 weight % |
| WO$_3$ | 0 - 3 weight % |
| Bi$_2$O$_3$ | 0 - 3 weight % |
| MoO$_3$ | 0 - 3 weight %. |

CLAIM 11

Column 14, line 9, cancel the table beginning with "SiO$_2$ 49-58.5 weight %" to and ending "MoO$_3$ 0-3 weight %." in column 14, line 25, and insert the following table:

| | |
|---|---|
| SiO$_2$ | 49 - 69 weight % |
| B$_2$O$_3$ | 0 weight % |
| Al$_2$O$_3$ | >4.7 - 14 weight % |
| Li$_2$O | 0 - 4 weight % |
| Na$_2$O | >12-18 weight % |
| K$_2$O | >0 - 8 weight %, wherein the |
| sum Li$_2$O+Na$_2$O+K$_2$O is | >12-19 weight %, and |
| MgO | 0 - 5 weight % |
| CaO | 7 - <12 weight % |
| SrO | 0 weight % |
| BaO | 0-12 weight % |
| wherein the | |
| sum MgO+CaO+SrO+BaO is | 7 - 19 weight %, and |
| F | 0 - 3 weight % |
| TiO$_2$ | 0 - 5 weight % |
| Fe$_2$O$_3$ | 0 - 0.5 weight % |
| ZrO$_2$ | >1 - 9 weight % |
| CeO$_2$ | 0 - 3 weight % |
| WO$_3$ | 0 - 3 weight % |
| Bi$_2$O$_3$ | 0 - 3 weight % |
| MoO$_3$ | 0 - 3 weight %. |

CLAIM 12
Column 14, line 32, cancel the table beginning with "SiO$_2$  49-66 weight %" to and ending "MoO$_3$  0-3 weight %," in column 14, line 45, and insert the following table:

| | |
|---|---|
| SiO$_2$ | 49 - 58.5 weight % |
| B$_2$O$_3$ | 0 weight % |
| Al$_2$O$_3$ | >5 - 14 weight % |
| Li$_2$O | 0 - <0.3 weight % |
| Na$_2$O | >12-18 weight % |
| K$_2$O | >0 - <5 weight %, wherein the |
| sum Li$_2$O+Na$_2$O+K$_2$O is | >12-19 weight %, and |
| MgO | 0 - 5 weight % |
| CaO | 7 - <12 weight % |
| SrO | 0 weight % |
| BaO | 0-12 weight % |
| wherein the | |
| sum MgO+CaO+SrO+BaO is | 7 - 19 weight %, and |
| F | 0 - 3 weight % |
| TiO$_2$ | >0.5 - 5 weight % |
| Fe$_2$O$_3$ | 0 - 0.5 weight % |
| ZrO$_2$ | >1 - 9 weight % |
| CeO$_2$ | 0 - 3 weight % |
| WO$_3$ | 0 - 3 weight % |
| Bi$_2$O$_3$ | 0 - 3 weight % |
| MoO$_3$ | 0 - 3 weight %. |

CLAIM 14
Column 14, line 55, cancel the table beginning with "SiO$_2$  49-58.5 weight %" to and ending "MoO$_3$  0-3 weight %," in column 15, line 3, and insert the following table:

| | |
|---|---|
| SiO$_2$ | 49 - 66 weight % |
| Al$_2$O$_3$ | >4.7 - 14 weight % |
| Na$_2$O | >12-18 weight % |
| K$_2$O | >0.5 - 8 weight %, wherein the |
| sum Na$_2$O+ K$_2$O is | >12-19 weight %, and |
| MgO | 0.1 - 3 weight % |
| CaO | 7 - <12 weight % |
| BaO | >1 - 9 weight %, wherein the |
| sum MgO+CaO+BaO is | 8.2 - 19 weight %, and |
| F | 0 - 3 weight % |
| TiO$_2$ | 0 - 5 weight % |
| Fe$_2$O$_3$ | 0 - 0.5 weight % |
| ZrO$_2$ | >1 - 9 weight % |
| CeO$_2$ | 0 - 3 weight % |
| WO$_3$ | 0 - 3 weight % |
| Bi$_2$O$_3$ | 0 - 3 weight % |
| MoO$_3$ | 0 - 3 weight %, |

CLAIM 15
Column 15, line 12, cancel the table beginning with "$SiO_2$  49-69 weight %" to and ending "$MoO_3$  0-3 weight %," in column 15, line 28, and insert the following table:

| | |
|---|---|
| $SiO_2$ | 49 - 58.5 weight % |
| $Al_2O_3$ | >5 - 14 weight % |
| $Na_2O$ | >12-18 weight % |
| $K_2O$ | >0 - <5 weight %, wherein the |
| sum $Na_2O + K_2O$ is | 12-19 weight %, and |
| MgO | 0.1 - 3 weight % |
| CaO | 7 - <12 weight % |
| BaO | 0-12 weight %, wherein the |
| sum MgO+CaO+BaO is | 8.2 - 19 weight %, and |
| F | 0 - 3 weight % |
| $TiO_2$ | >0.5 - 5 weight % |
| $Fe_2O_3$ | 0 - 0.5 weight % |
| $ZrO_2$ | >1 - 9 weight % |
| $CeO_2$ | 0 - 3 weight % |
| $WO_3$ | 0 - 3 weight % |
| $Bi_2O_3$ | 0 - 3 weight % |
| $MoO_3$ | 0 - 3 weight %, |

-- --

CLAIM 19
Column 15, line 47, cancel the table beginning with "$SiO_2$  49-<59 weight %" to and ending "$MoO_3$  0-3 weight %," in column 15, line 63, and insert the following table:

| | |
|---|---|
| $SiO_2$ | 49 - 69 weight % |
| $B_2O_3$ | 0 - 2 weight % |
| $Al_2O_3$ | >4.7 - 15 weight % |
| $Li_2O$ | 0 - 4 weight % |
| $Na_2O$ | >12-18 weight % |
| $K_2O$ | >0 - 8 weight %, wherein the |
| sum $Li_2O+Na_2O+K_2O$ is | >12-19 weight %, and |
| MgO | 0 - 6 weight % |
| CaO | 5 - <12 weight % |
| SrO | 0 weight % |
| BaO | 0-12 weight % |
| wherein the | |
| sum MgO+CaO+SrO+BaO is | 5 - 19 weight %, and |
| F | 0 - 3 weight % |
| $TiO_2$ | 0 - 10 weight % |
| $Fe_2O_3$ | 0 - 0.5 weight % |
| $ZrO_2$ | >0.5 - 9 weight % |
| $CeO_2$ | 0 - 3 weight % |
| $WO_3$ | 0 - 3 weight % |
| $Bi_2O_3$ | 0 - 3 weight % |
| $MoO_3$ | 0 - 3 weight %, |

CLAIM 21
Column 16, line 11, cancel the table beginning with "SiO₂ 49-69 weight %" to and ending "MoO₃ 0-3 weight %," in column 15, line 29, and insert the following table:

| | |
|---|---|
| $SiO_2$ | 49 - <59 weight % |
| $B_2O_3$ | 0 weight % |
| $Al_2O_3$ | >5 - 15 weight % |
| $Li_2O$ | 0 - <0.3 weight % |
| $Na_2O$ | >12-18 weight % |
| $K_2O$ | >0 - <5 weight %, wherein the |
| sum $Li_2O+Na_2O+K_2O$ is | >12-19 weight %, and |
| MgO | 0 - 6 weight % |
| CaO | 5 - <12 weight % |
| SrO | 0 weight % |
| BaO | 0-10 weight % |
| wherein the | |
| sum MgO+CaO+SrO+BaO is | 5 - 19 weight %, and |
| F | 0 - 3 weight % |
| $TiO_2$ | >0.1 - 10 weight % |
| $Fe_2O_3$ | 0 - 0.5 weight % |
| $ZrO_2$ | >0.5 - 9 weight % |
| $CeO_2$ | 0 - 3 weight % |
| $WO_3$ | 0 - 3 weight % |
| $Bi_2O_3$ | 0 - 3 weight % |
| $MoO_3$ | 0 - 3 weight %. |

CLAIM 25
Column 16, line 42, cancel the table beginning with "SiO₂ 49-69 weight %" to and ending "MoO₃ 0-3 weight %," in column 16, line 59, and insert the following table:

| | |
|---|---|
| $SiO_2$ | 49 - 69 weight % |
| $B_2O_3$ | 0 - 2 weight % |
| $Al_2O_3$ | >4.7 - 15 weight % |
| $Li_2O$ | 0 - 4 weight % |
| $Na_2O$ | >12-18 weight % |
| $K_2O$ | >0 - 8 weight %, wherein the |
| sum $Li_2O+Na_2O+K_2O$ is | >12-19 weight %, and |
| MgO | 0 - 6 weight % |
| CaO | 5 - <12 weight % |
| SrO | 0 weight % |
| BaO | 0-12 weight % |
| wherein the | |
| sum MgO+CaO+SrO+BaO is | 5 - 19 weight %, and |
| F | 0 - 3 weight % |
| $TiO_2$ | 0 - 10 weight % |
| $Fe_2O_3$ | 0 - 0.5 weight % |
| $ZrO_2$ | >0.5 - 9 weight % |
| $CeO_2$ | 0 - 3 weight % |
| $WO_3$ | 0 - 3 weight % |
| $Bi_2O_3$ | 0 - 3 weight % |
| $MoO_3$ | 0 - 3 weight %, |